UNITED STATES PATENT OFFICE.

ISAAC MAYER, OF NEW YORK, N. Y.

IMPROVEMENT IN PURIFYING RAW ANIMAL-FATS.

Specification forming part of Letters Patent No. 195,297, dated September 18, 1877; application filed June 18, 1877.

*To all whom it may concern:*

Be it known that I, ISAAC MAYER, of the city, county, and State of New York, have invented a new and Improved Process of Preparing Machine-Tallow, of which the following is a specification:

The object of this invention is to furnish a superior machine-tallow, by a quick, cheap, and convenient process, from raw animal-fat without the use of special machinery; and it consists of treating the raw fat with diluted nitric acid, then boiling the fat, and finally separating the tallow from the heavier fibers by cooling.

The raw animal-fat is first cut up in small slices or blocks of about one inch in size, and then treated in a wooden vessel with diluted nitric acid of about 2° Baumé. The acid has to cover entirely the fat, and is allowed to remain in the vessel for from thirty to forty-eight hours or more, the liquid being then poured off, and the so-prepared fat exposed to boiling in an iron vessel for from fifteen to thirty minutes, the fat being stirred up from time to time to prevent the burning of the fibrous and tendinous parts. The fat is then removed and allowed to cool under addition of water, the fibrous parts settling on the bottom of the cooling-vessel, while the tallow is obtained at the top, and readily drawn off or removed.

The fibrous sediments form a valuable food for pigs, while the tallow is of clear and superior nature, and obtained in a cheap and convenient manner, without the use of expensive presses, &c., and without producing any obnoxious odors.

Having thus described my invention, I claim as new and desire to secure by Letters Patent—

The process of treating tallow in the cold, for purifying same, consisting in macerating in dilute nitric acid and subsequently removing the same from the acid liquor and boiling it, in the manner substantially as set forth.

ISAAC MAYER.

Witnesses:
PAUL GOEPEL,
ALEX. F. ROBERTS.